(12) United States Patent
Lodolo

(10) Patent No.: US 8,316,878 B2
(45) Date of Patent: Nov. 27, 2012

(54) SERVO-OPERATED VALVE

(76) Inventor: Alberto Lodolo, Genoa (IT)

( * ) Notice: Subject to any disclaimer, the term of this patent is extended or adjusted under 35 U.S.C. 154(b) by 924 days.

(21) Appl. No.: 12/373,155

(22) PCT Filed: Sep. 18, 2006

(86) PCT No.: PCT/EP2006/066470
§ 371 (c)(1), (2), (4) Date: Feb. 11, 2009

(87) PCT Pub. No.: WO2008/034463
PCT Pub. Date: Mar. 27, 2008

(65) Prior Publication Data
US 2010/0012868 A1    Jan. 21, 2010

(51) Int. Cl.
*F16K 31/385* (2006.01)

(52) U.S. Cl. .............. 137/315.05; 137/375; 137/461; 251/61.1; 251/331; 251/335.2

(58) Field of Classification Search ........... 251/331, 251/335.2, 61–61.5, 28; 137/315.05, 375, 137/461
See application file for complete search history.

(56) References Cited

U.S. PATENT DOCUMENTS

| | | | | |
|---|---|---|---|---|
| 2,936,998 A * | 5/1960 | Loepsinger | ............... | 251/331 |
| 3,078,066 A * | 2/1963 | Moore | ............... | 251/61.1 |
| 3,349,795 A * | 10/1967 | Matsutani | ............... | 137/375 |
| 3,379,406 A | 4/1968 | Greer | | |
| 3,802,462 A * | 4/1974 | Trosch | ............... | 137/556 |
| 4,067,359 A * | 1/1978 | Kwast | ............... | 137/630.14 |
| 4,180,241 A * | 12/1979 | Fiedler, Jr. | ............... | 251/129.03 |
| 4,188,971 A * | 2/1980 | Otteson | ............... | 137/460 |
| 4,214,604 A * | 7/1980 | Rumsey | ............... | 137/375 |
| 4,244,554 A | 1/1981 | DiMauro et al. | | |
| 4,624,442 A * | 11/1986 | Duffy et al. | ............... | 251/61.1 |
| 4,715,578 A * | 12/1987 | Seltzer | ............... | 251/25 |
| 4,826,132 A * | 5/1989 | Moldenhauer | ............... | 251/129.17 |
| 5,383,646 A | 1/1995 | Weingarten | | |
| 5,545,026 A * | 8/1996 | Fritz et al. | ............... | 425/389 |
| 5,769,387 A * | 6/1998 | Perez C. | ............... | 251/61.4 |
| 6,102,071 A * | 8/2000 | Walton et al. | ............... | 137/540 |
| 6,145,810 A * | 11/2000 | Connolly et al. | ............... | 251/331 |
| 6,505,640 B1 * | 1/2003 | Lin | ............... | 137/505.46 |
| 6,752,371 B2 * | 6/2004 | Herbert et al. | ............... | 251/54 |
| 2005/0189506 A1 * | 9/2005 | Lee | ............... | 251/30.01 |
| 2006/0273206 A1 * | 12/2006 | Schulz et al. | ............... | 239/533.1 |

FOREIGN PATENT DOCUMENTS

GB    1478239    *    6/1977
WO    95 14874        6/1995

* cited by examiner

*Primary Examiner* — John Bastianelli
(74) *Attorney, Agent, or Firm* — Oblon, Spivak, McClelland, Maier & Neustadt, L.L.P.

(57) ABSTRACT

A single chamber two-way servo-operated valve includes: a valve body presenting an inlet aperture, an outlet aperture, and an access; a cover to close the access of the valve body; a port dividing the valve body interior into an inlet section and an outlet section; a valving element including a disc for closing the port; and an actuating chamber at least partially defined by the cover. The disc and a flexible diaphragm are connected to the valving element. The disc of the valving element includes a rigid central core which is at least partially covered by a rubber layer adhering to the central core. The rubber layer extends from the edge of the disc to form the flexible diaphragm.

12 Claims, 2 Drawing Sheets

SERVO-OPERATED VALVE

BACKGROUND OF THE INVENTION

1. Field of the Invention

The present invention relates to a single chamber two-way servo-operated valve in accordance with the introduction to the main claim.

In the state of the art two-way servo-operated valves present a valving disc which closes a port and is keyed onto a stem controlled by an actuator which can be of separated chamber or single chamber type.

In separated chamber models the actuator comprises a rigid actuator disc with a connected diaphragm which is clamped onto the end of the actuator edge by a cover, to hence divide the actuator volume into a first chamber on one side of the actuator disc and a second chamber on the opposite side. The two chambers are completely separated from each other and from the fluid which flows through the valve. Normally the actuator disc is composed of two superposed discs keyed onto the stem, between them there being clamped the diaphragm which is holed in the centre for passage of the stem. In this manner the diaphragm is connected to the actuator disc and follows its movements by flexing. An actuator fluid enters one of the actuating chambers to control the movement of the actuator disc and of the valving element keyed onto the same stem.

The actuator fluid can be the same as that flowing through the valve and withdrawn upstream of its entry into the valve, but is generally a different fluid at higher pressure, to achieve a smaller-dimension actuator.

In single chamber valves there is only one actuating chamber defined by the inner surface of a cover, by a side of the actuator disc and by the flexible diaphragm connected to it, the edge of which is clamped between the cover and the valve body. The fluid to be intercepted by the valve flows on the other side of the actuator disc and acts on the actuator with its pressure. In this case the function of the actuator disc and of the valving disc can be performed by a single actuator/valving disc (hereinafter known simply as "disc"). It currently consists of two superposed discs keyed onto a stem, between them there being clamped a diaphragm holed in its centre for passage of the stem, its edge being clamped between the cover and the valve body to separate the actuating chamber from the fluid flowing through the valve, to enable the valving element to move with diaphragm flexure.

The fluid fed into the actuating chamber for valve operation is normally the same as that flowing through the valve, withdrawn upstream of the port to be closed by the valving element.

When the fluid withdrawn upstream of the port is fed into the actuating chamber it presses against the disc and, possibly aided by a spring or elastic member, closes the valving element by overcoming the pressure exerted by the fluid flowing through the valve on the other side of the disc, separated from the actuating chamber. To obtain movement in the opposite direction, the actuating chamber has merely to be emptied.

The stem normally emerges from the cover to visually indicate the valve opening or closure state. This reduces the active surface of the disc on the actuating chamber side.

Even though a single chamber valve represents a considerable constructional simplification compared with a double chamber valve, it still comprises a considerable number of component parts: a flexible diaphragm, an actuator/valving disc formed in two parts to clamp the diaphragm, a stem, a gasket for sealing the valving disc against the edge of the port to be closed, and a clamping element between the stem and discs.

The large number of parts also results in complicated assembly, resulting in longer times and possible errors.

2. Description of the Related Art

Simpler single chamber valves also exist in which the valving element is formed from a simple fabric-incorporated rubber diaphragm, with valving element inflexion for opening. However such valves cannot be used in applications in which the operating pressures are high, and also result in less precise operation, for which reason they are excluded from certain specifications.

BRIEF SUMMARY OF THE INVENTION

An object of the present invention is therefore to provide a hydraulic valve by which the stated drawbacks are overcome, and in particular a two-way servo-operated valve formed from a small number of component parts and hence with low production cost.

Another object is to provide a hydraulic valve which is simple and quick to assemble and disassemble.

A further object is to achieve simpler and hence less costly component parts.

Said objects are attained by a valve, by a valving element and by a cover, the inventive characteristics of which are defined in the claims.

BRIEF DESCRIPTION OF THE DRAWINGS

The invention will be more apparent from the ensuing detailed description, provided by way of non-limiting example, of a preferred embodiment of the valve, of the cover and of two preferred embodiments of the valving element, illustrated in the accompanying drawings, in which.

DETAILED DESCRIPTION OF THE INVENTION

Figure 1:
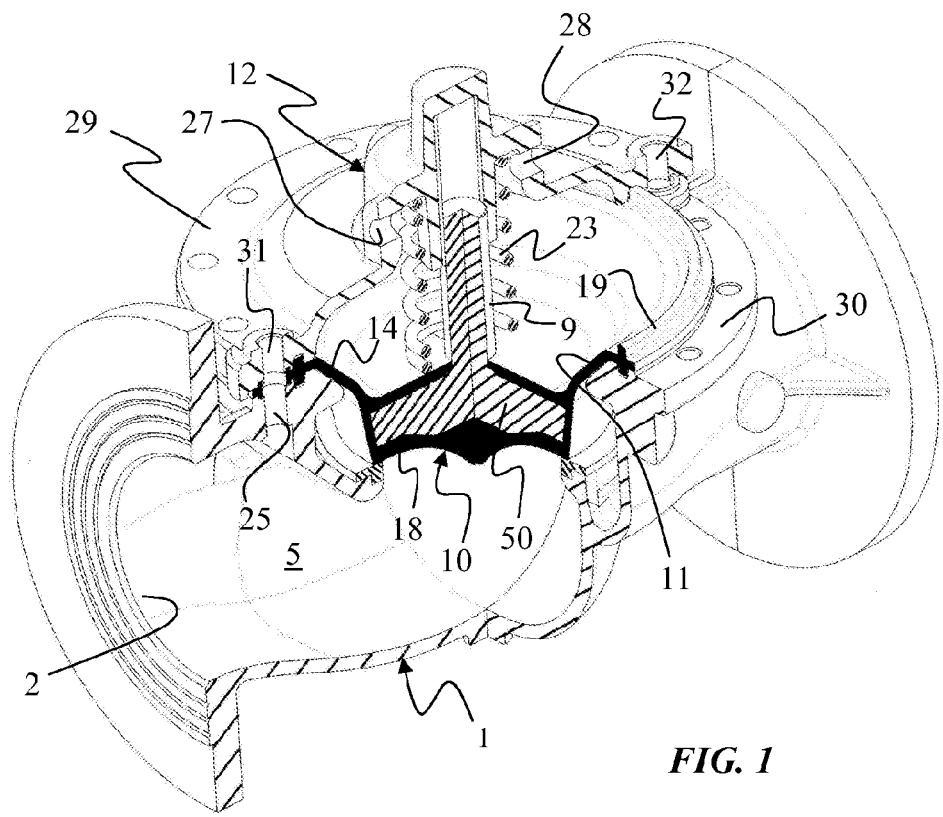
FIG. 1 is a perspective view of a section of the valve according to the invention, obtained by sectioning the valve body and the valving element along two perpendicular planes and the cover along a longitudinal plane.

With reference to FIG. 1, it can be seen that the two-way valve comprises a valve body 1 flanged at its two ends, with a cover 12 closing an access 11. Said cover comprises a lateral flange 29 to be connected to a flange 30 provided on the valve body 1. This valve can be used to intercept liquid and gaseous fluids of various types, more commonly water, oil and liquids in general, but also gases and vapours.

Figure 2:
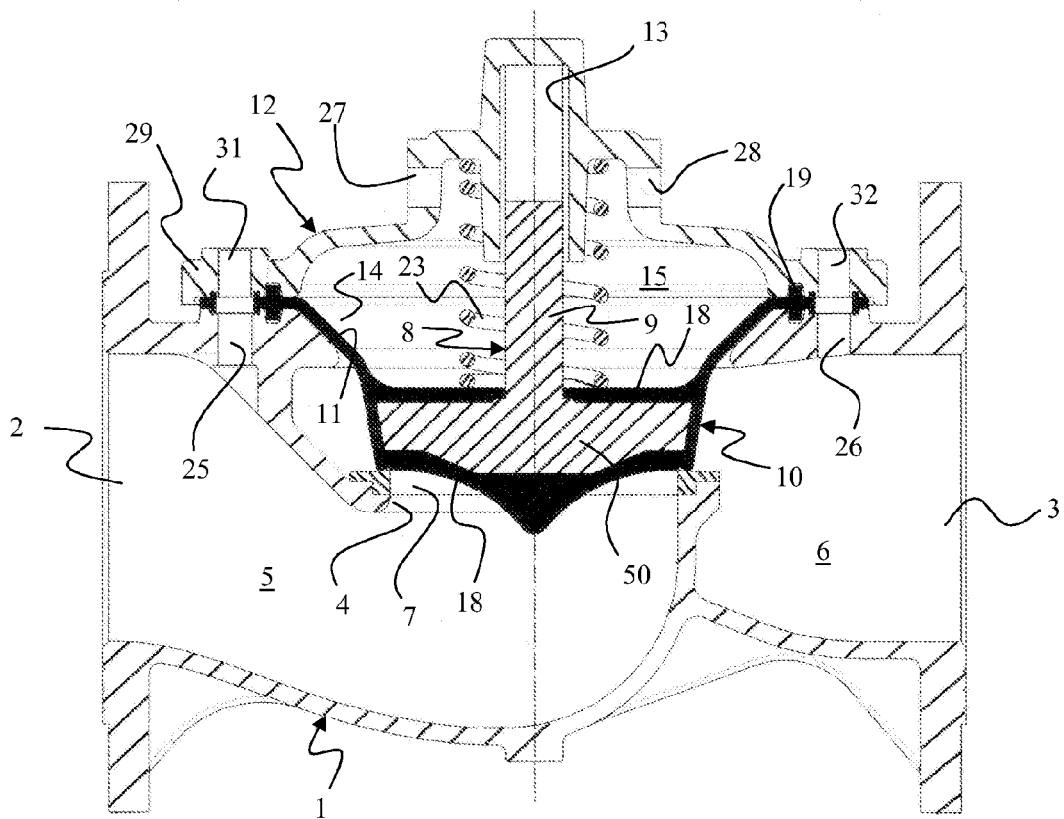
FIG. 2 is a longitudinal section through the valve with a first embodiment of the valving element.

With reference to FIG. 2 it can be seen that this valve is of the single chamber type. The valve body presents in its interior a flow tube with an inlet aperture 2 and an outlet aperture 3, between which the circular port 4 is positioned to separate the flow tube into an inlet section 5 and an outlet section 6. The edge of the port 4 carries a metal seal ring 7 screwed into its seat.

At the port 4, the valve body 1 presents an access 11 to be closed by a cover 12, the edge of which forms a lateral flange 29 for connection to the valve body 1.

A valving element 8 is disposed at the port 4 and at the access 11 to close or open the port 4 by a translational movement.

Said valving element 8 comprises a disc 10 to close the port 4 and a stem 9 to guide the travel of the valving element 8. The disc 10 of the valving element 8 comprises a rigid central core 50 covered with a rubber layer 18 adhering to said central core 50. Said rubber layer 18 extends from the edge of the disc 10 to form an annular flexible diaphragm 14. The diaphragm 14 is clamped peripherally between the valve body 1 and cover 12 to define, together with the inner surface of the cover 12 and the upper side of the disc 10, an actuating chamber 15 separated from the flow tube. The edge of the diaphragm 14 to be clamped between the cover 12 and valve body 1 forms a gasket ring 19, to be inserted into suitable seats in the cover and valve body to hence ensure the seal. The flexible diaphragm 14 hence extends from the surface of the disc 10 and is formed by the extension of the rubber layer 18 beyond the edge of the rigid central core 50 of the disc 10. The disc 10 and flexible diaphragm 14 form a single element with rigid and flexible parts which are not mutually separable. The disc 10 presents said rubber layer 18 over its entire surface, in particular in that region intended to rest on the seal ring 7. In this respect, the rubber layer 18 also acts as a gasket to provide a seal when the disc 10 presses against the seal ring 7 to close the port 4. In proximity to the central core 50 the diaphragm 14 presents a greater thickness than that of the free parts distant from the central core 50, these free parts being those parts of the diaphragm 14 not clamped between the cover 12 and valve body 1. The flexible diaphragm 14 is preformed by deep-drawing to form a cavity such that the valving element 8 lies naturally in the closure position for the port 4 to facilitate, by its elasticity, the action of the fluid in the actuating chamber 15 against the pressure of the fluid flowing through the flow tube on the opposite side of the disc 10. To withstand repeated stresses the flexible diaphragm 14 is fabric-incorporated, and for continuity the rubber layer 18 is also fabric-incorporated, at least on one side of the disc 10. The central core of the disc 10 is preferably of metal. The lower surface of the disc 10 presents a slight central swelling directed downwards (as in FIG. 2) or a convexity, making the opening and closure of the valving element 8 smoother. The stem 9, which projects from only one of the two sides of the disc 10, can be made in one piece with the central core 50 or be removably fixable to the disc 10. The stem 9 is constrained to slide within a guide 13 provided on the inner surface of the cover 12. For greater constructional simplicity, the stem 9 projects from only one side of the disc 10 and the valve comprises, for the stem 9, only one guide, disposed on one of the two sides of the disc 10. The guide 13 is formed as a dead-ended hole. As the stem alone withstands the strong flexing moments exerted on the valving element 8, it must have a sufficiently large cross-section. The stem 9 also presents longitudinal grooves which connect the base of said dead-ended hole 13 to the actuating chamber 15. These longitudinal grooves can also be present on the inner surface of the dead-ended hole 13. This results in a greater active surface of the actuating chamber 15, which is also useful in consideration of the considerable cross-section of the stem 9 compared with valves having valving elements guided on two sides of the disc. A small indicator rod could emerge outwards from the end of the dead-ended hole to visually indicate the valving element position.

Both the guide 13 and the stem 9 are covered with coatings which facilitate their sliding and limit wear.

In the example of FIGS. 1 and 2 a spring 23 is also present, resting on the inner surface of the cover 12 to urge the valving element 8 into the position in which it closes the port 4 and to facilitate the action of the fluid within the actuating chamber 15.

The access 11 presents an outward flare acting as a support for the diaphragm 14 when the valving element 8 closes the port 4. The disc 10 of the valving element 8 presents a thickness and diameter sufficient to provide complete support for the diaphragm 14 on the flare of the access 11 and hence prevent excessive deformation and stresses which the diaphragm 14 would undergo if unsupported. In the same manner the cover 12 lowerly presents a convex central portion for supporting the diaphragm 14 when the valving element 8 is raised into the valve open position.

Figure 3:
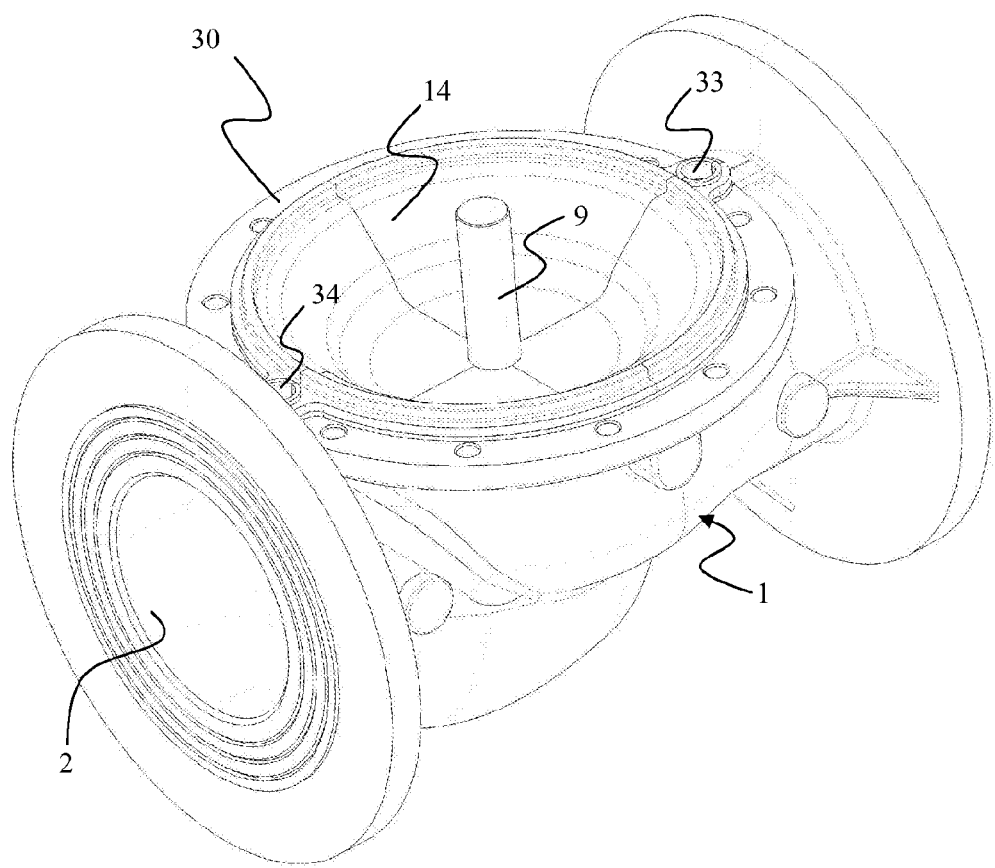
FIG. 3 is a perspective view of the valve and valving element without the cover.

The cover 12 presents two actuator holes 27, 28 in its central portion. In the valve body 1 the inlet section 5 presents an inlet hole 25, the outlet section 6 presenting an outlet hole 26. The lateral flange 29 of the cover 12 presents two lateral through holes 31, 32 to overlie the inlet hole 25 and outlet hole 26. The flexible diaphragm presents two tabs (visible in FIG. 3) with two peripheral holes 33 and 34 to be interposed between the cover 12 and valve body 1 in positions corresponding with the lateral holes 31, 32 of the cover superposed on the inlet hole 25 and outlet hole 26 of the valve body. The actuating chamber 15 can hence be connected by suitable tubes (not shown for simplicity) both to the inlet section 5 (by a tube connecting the actuator hole 27 to the lateral hole 31 superposed on the inlet hole 25) and to the outlet section 5 (by a tube connecting the actuator hole 28 to the lateral hole 32 superposed on the outlet hole 26). These connection tubes can evidently be connected together, and cocks, manometers and other devices can be connected to them. By this constructional arrangement, both ends of the connection tubes are connected to the cover 12 with the considerable advantage that the cover can be easily separated from the valve body without having to disconnect the tubes.

When in operation the fluid enters the valve through the inlet aperture 2, occupies the inlet section 5 and, if the valving element 8 is raised, passes through the port 4, then below the disc 10 and the diaphragm 14, to reach the outlet section 6 and then leave the valve through the outlet aperture 3. If the valving element 8 is lowered, the port 4 is closed and the fluid occupying the inlet section 5 is unable to pass to the outlet section 6, it remaining confined upstream of the port 4.

The valving element can be lowered by feeding a pressurized fluid into the actuating chamber 15, immediately above the disc 10, through an actuator hole 27, while the other actuator hole 28 is closed. The presence of a fluid at sufficient pressure in the actuating chamber 15 causes the valving element 8 to lower and close the port 4. The fluid of sufficient pressure can be the same fluid as that flowing through the valve, withdrawn upstream of the port 4 through the inlet hole 25.

The pressure of this fluid is sufficient to lower the valving element 8, both because the fluid flowing through the flow tube presents a lower pressure by the effect of its velocity (Bernoulli effect), and because of the action of the spring 23, and again because the preforming of the diaphragm and its elasticity, inversely proportional to its thickness, favour the action of the fluid within the actuating chamber 15 and the closure of the port 4 by the valving element 8.

When the connection between the actuating chamber 15 and the inlet section 5 is interrupted but the connection between the actuating chamber 15 and the outlet section 6, or between the actuating chamber 15 and the outside environment at atmospheric pressure, is open, the liquid flows from the actuating chamber 15 and the pressure of the liquid present below the valving element 8 causes it to rise, hence opening the port 4 and enabling the liquid to pass through it.

In FIGS. 1 and 2 it can be seen that in a first embodiment of the valving element 8, the disc 10 and stem 9 are made in one piece. The disc 10 is completely covered with the rubber layer 18, while the stem 9 presents a covering of antiwear material facilitating its sliding within the guide.

Figure 4:
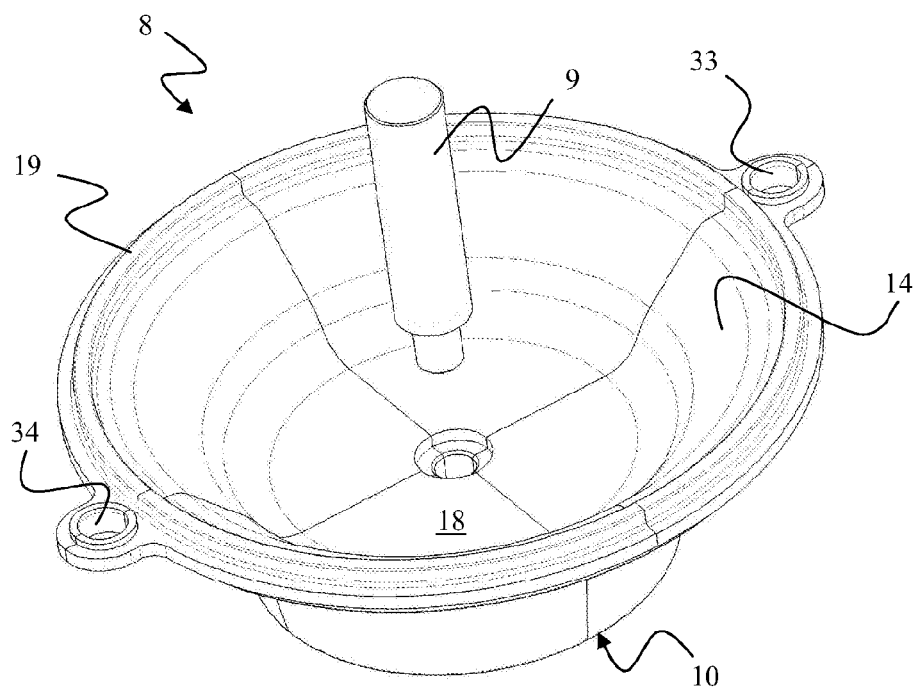
FIG. 4 is a perspective view of a second embodiment of the valving element alone.

FIG. 4 shows a second embodiment of the valving element 8 with the disc rubber-covered and the preformed flexible diaphragm 14 which extends from the edge of the disc 10 forming a concavity on the same side as the stem 9. In this case the disc 10 can be separated from the stem 9. This embodiment is preferred in the case of large valve dimensions, because of which the valving element 8, if the stem and disc were made in one piece, would be excessively bulky for transport.

Instead of being guided along the stem 9, the valving element 8 could also be guided along any element forming part of the valving element 8 or rigidly connected thereto, for example fins (not present in the illustrated examples).

There are two rules relating to the length of a valve in relation to its rated diameter: one is known in technical jargon as long ISO (ISO being International Standard Organisation) and corresponding to DIN 3202 F1, and the other known as short ISO corresponding to DIN 3202 F5. The preformed diaphragm 14 enables an accentuated flaring of the access 11 to be achieved, together with a smaller access diameter. This results in a shorter length of the valve, which can pass from the long ISO category to the short ISO category.

The valve of the invention comprises a smaller number of parts than currently existing single chamber two-way servo-operated valves. Because of the preforming of the diaphragm 14 and its elasticity, the spring can also be superfluous.

The present patent also protects a valving element 8 of a servo-operated valve comprising a disc 10 with a rigid central core 50 at least partially covered by a rubber layer 18 adhering to said central core 50, said rubber layer 18 extending from the edge of the disc 10 to form a flexible diaphragm 14.

The diaphragm 14 can be preformed such as to form a concavity facilitating the action of the fluid located on one side of the disc 10, against the fluid located on the other side.

Said valving element 8 can advantageously present two peripheral holes 33 and 34 in proximity to that edge of the diaphragm 14 to be clamped.

The present patent also protects a cover 12 for a single chamber two-way servo-operated valve, said cover 12 presenting a central portion with two actuator holes 27, 28 and a lateral connection flange 29 presenting a plurality of connection holes to receive bolts for its clamping to the valve body and two lateral through holes 31, 32 for fluid passage.

The invention claimed is:

1. A single chamber two-way servo-operated valve, comprising:
    a valve body;
    a flow tube disposed within an interior of the valve body, the flow tube including an inlet aperture, an outlet aperture, and an access;
    a cover to close the access of the flow tube;
    a port dividing the flow tube into an inlet section and an outlet section;
    a valving element including a disc for closing said port, the disc of said valving element having a rigid central core which is at least partially covered by a rubber layer adhering to said central core; and
    a flexible diaphragm connected to the disc to separate the flow tube from an actuating chamber lying between the disc and the cover, said rubber layer extending from an edge of the disc to form the flexible diaphragm,
    wherein said valving element includes a stem which projects from only one side of the disc,
    wherein the cover includes a dead-ended hole acting as a guide for the stem,
    wherein the cover includes a central portion with two actuator holes and a lateral flange for connecting the cover to the valve body,
    wherein the valve body includes an inlet hole in the inlet section and an outlet hole in the outlet section, and
    wherein the lateral flange of the cover includes two lateral through holes to be superposed on the inlet hole and the outlet hole to connect the inlet section and the outlet section to the actuating chamber.

2. The valve as claimed in claim 1, wherein the diaphragm is preformed by deep-drawing such that the valving element lies naturally in a closure position, such that an elasticity of the diaphragm urges the valving element toward the port.

3. The valve as claimed in claim 1, wherein a thickness of the diaphragm in proximity to the central core is greater than a thickness of free parts of the diaphragm that are distant from the central core.

4. The valve as claimed in claim 1, wherein said flexible diaphragm is clamped peripherally between the valve body and the cover.

5. The valve as claimed in claim 1, wherein an edge of the diaphragm forms a gasket ring.

6. The valve as claimed in claim 1, wherein said central core is made of metal.

7. The valve as claimed in claim 1, wherein said stem is made in one piece with the central core.

8. The valve as claimed in claim 1, wherein said stem is removably fixable to the disc.

9. The valve as claimed in claim 1, wherein the stem or the dead-ended hole include longitudinal grooves which connect the actuating chamber to an end of said dead-ended hole.

10. The valve as claimed in claim 1, wherein said rubber layer completely covers the disc.

11. The valve as claimed in claim 1 wherein the diaphragm is preformed to form a concavity.

12. The valve as claimed in claim 1, wherein the valving element includes two peripheral holes in proximity to an edge of the diaphragm to be clamped.

* * * * *